United States Patent Office 3,839,432
Patented Oct. 1, 1974

3,839,432
NITRILE HYDROLYSIS PROCESS
Richard V. Norton, Wilmington, Del., assignor to Sun Research and Development Co., Marcus Hook, Pa.
No Drawing. Filed July 20, 1973, Ser. No. 381,304
Int. Cl. C07c 63/14, 63/26, 63/40
U.S. Cl. 260—515 P                  5 Claims

ABSTRACT OF THE DISCLOSURE

A process for the hydrolysis of an aromatic nitrile to the corresponding acid whereby an acid product low in nitrogen impurities is obtained by hydrolyzing the nitrile with aqueous acetic acid at a temperature of from about 250° C. to about 325° C., said aqueous acetic acid solution containing from about 5% by weight to about 40% by weight of acetic acid and wherein the mole ratio of acetic acid used per mole of nitrile is from about 2.0 to about 4.0.

---

Terephthalic acid (TPA) is a well known intermediate to polyester fiber and film and it is art recognized that when TPA is employed for making polyester fibers it must be of extremely high purity. TPA may be made by the aqueous acid hydrolysis of terephthalonitrile (TPN) which is the product of the ammoxidation of p-xylene. Acid hydrolysis of TPN in aqueous systems frequently leads to TPA having a significant impurity content as determined by the presence of nitrogen in the product and it is then necessary to subject the TPA to expensive separation and purification procedures.

It is disclosed in Japanese Patent 1967–8020 (Mar. 31, 1967) that by hydrolyzing TPN in an aqueous acetic acid solution containing less than 30% water (e.g., the acid concentration is above 70%) a TPA product of high purity is obtained. However, I have found that the process described in that patent gives a TPA product which is still rather high in nitrogen impurities and thus does not provide a TPA suitable for polyester fiber manufacture.

I have now found an improved process for hydrolysis of TPN and other aromatic nitriles in aqueous acetic acid whereby the product acid is of very high purity as evidenced by very low nitrogen residues and my process is carried out with dilute aqueous acetic acid under highly specific mole ratios of acid to nitrile. In accord with my invention the nitrile is hydolyzed with aqueous acetic acid at a temperature of from about 250° C. to about 325° C. for about one to about ten hours, said aqueous acetic acid solution containing from about 5% by weight to about 40% by weight of acetic acid and wherein the mole ratio of acetic acid used per mole of nitrile is from about 2.0 to about 4.0.

Although the process of the invention is particularly useful with terephthalonitrile because of the need for highly pure terephthalic acid, other aromatic mono- and polynitriles of the benzene and naphthalene series may be used. Thus, benzonitrile, phthalonitrile, isophthalonitrile, 2,6-dicyanonaphthalene, and the like are useful examples, but preferably the process will be used with dinitriles of the benzene series, most particularly terephthalonitrile.

As pointed out above, the invention requires that the acetic acid used in the process be of a concentration between about 5% and about 40% by weight; i.e., it is dilute acetic acid as distinguished from the concentrated acid of the prior art. It is surprising, in view of the weak acid characteristics of dilute acetic acid, that hydrolysis occurs so effectively and gives product of a high purity. Also, surprisingly, when the acetic acid is of higher concentration than 40% the purity of the acid product is significantly reduced. Preferably, the hydrolysis will be carried out with an acid concentration of about 20% to about 30% and at a mole ratio of acid for nitrile of about 3.5 to about 3.75.

Another necessary parameter of the process is the need to have the mole ratio of acetic acid per mole of phthalonitrile to be from about 2.0 to about 4.0. Unless these parameters are maintained, the purity of the acid product is lower than desired.

The hydrolysis of the process is carried out at a temperature of from about 250° C. to about 325° C. and is accomplished in any standard pressure vessel. Time of reaction is not critical, but will generally be from about one to about ten hours, preferably about three to about ten hours in order to reduce the nitrogen content of the product to a minimum. It is also preferable to use titanium equipment rather than steel alloys in order to minimize any contamination problems.

In order to further illustrate the invention, the following examples are given:

EXAMPLES 1–4

Hydrolysis of the nitrile was carried out in a 2 liter liter titanium lined pressure vessel equipped with heating elements and stirrer.

The following tables show the conditions used and the results obtained:

TABLE I

Hydrolysis of Terephthalonitrile at 260° C.

| Example | Nitrogen found in terephthalic acid product, percent | | | |
|---|---|---|---|---|
| | a 1/10.8% HOAc | b 2/25% HOAc | c 3/40% HOAc | d 4/71.5% HOAc |
| Reaction time (hrs.): | | | | |
| 1 | 4.71 | 3.79 | 5.71 | 6.59 |
| 2 | 0.95 | 0.85 | 0.93 | 1.35 |
| 5 | 0.13 | 0.09 | 0.15 | 0.69 | a 1 mole TPN (128 g.); 2 moles HOAc (120 g.); 55 moles H$_2$O (990 g.).
b 1 mole TPN (128 g.); 3.6 moles HOAc (216 g.); 36 moles H$_2$O (649 g.).
c 1 mole TPN (128 g.); 3.6 moles HOAc (216 g.); 18 moles H$_2$O (324 g.).
d 1 mole TPN (128 g.); 5.54 moles HOAc (332 g.); 7.4 moles H$_2$O (133.4 g.).

As can be seen from the above data, the nitrogen content of the terephthalic acid is significantly lower in the examples carried out under the parameters of the invention (Examples 1–3) than that obtained under prior art conditions (Example 4, the conditions of the Japanese patent referred to above).

EXAMPLES 5–8

When the hydrolysis was carried out as in the above examples, but at 300° C. for three hours, the reaction was faster and nitrogen content was reduced as shown in the following table:

TABLE II

Hydrolysis of TPN at 300° C. for 3 hours

| Example | Nitrogen found in terephthalic acid product, percent | | | |
|---|---|---|---|---|
| | a 5/10.8% HOAc | b 6/25% HOAc | c 7/40% HOAc | d 8/71.5% HOAc |
| | 0.15 | 0.10 | 0.13 | 0.85 | a b c d See footnotes bottom of Table I.

EXAMPLES 9–12

The hydrolysis of Example 1 to 4 was carried out with isophthalonitrile (IPN) at 300° C. for 3 hours. Table III shows the results obtained:

TABLE III

Hydrolysis of IPN at 300° C. for 3 hours

| Example | Nitrogen found in isophthalic acid product, percent | | | |
|---|---|---|---|---|
| | a 9/10.8% HOAc | b 10/25% HOAc | c 11/40% HOAc | d 12/71.5% HOAc |
| | 0.26 | 0.13 | 0.21 | 0.83 | a b c d See footnote bottom of Table I.

It is clear from the above that the process of the invention makes a significant contribution for the art of nitrile hydrolysis in providing acid products with low nitrogen containing impurities.

The invention claimed is:

1. A process for the hydrolysis of a phthalonitrile of the benzene and naphthalene series to the corresponding acid whereby an acid product low in nitrogen impurities is obtained, which comprises hydrolyzing said nitrile with aqueous acetic acid at a temperature of from about 250° C. to about 325° C., said aqueous acetic acid solution containing from about 5% by weight to about 40% by weight of acetic acid and wherein the mole ratio of acetic acid used per mole of nitrile is from about 2.0 to about 4.0.

2. The process of Claim 1 wherein the nitrile is terephthalonitrile.

3. The process Claim 1 wherein the nitrile is isophthalonitrile.

4. A process for the hydrolysis of terephthalonitrile which comprises hydrolyzing said terephthalonitrile with aqueous acetic acid at a temperature of from about 250° C. to about 300° C. for about 3 to about 10 hours, said aqueous acetic acid solution containing from about 10% to about 25% by weight of acetic acid and wherein the mole ratio of acetic acid used per mole of nitrile is from about 3.5 to about 3.75.

5. A process for the hydrolysis of isophthalonitrile to isophthalic acid which comprises hydrolyzing said isophthalonitrile with aqueous acetic acid at a temperature of from about 250° C. to about 300° C. for about 3 to about 10 hours, said aqueous acetic acid solution containing from about 10% to about 25% by weight of acetic acid and wherein the mole ratio of acetic acid per mole of nitrile is from about 3.5 to about 3.75.

References Cited
FOREIGN PATENTS 8,020   3/1967   Japan _____ 260—515

JAMES A. PATTEN, Primary Examiner